(12) United States Patent
Louch et al.

(10) Patent No.: US 7,634,263 B2
(45) Date of Patent: Dec. 15, 2009

(54) REMOTE CONTROL OF ELECTRONIC DEVICES

(75) Inventors: John O. Louch, Cupertino, CA (US);
Eric Seymour, Cupertino, CA (US);
Michael Shebanek, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 467 days.

(21) Appl. No.: 11/343,514

(22) Filed: Jan. 30, 2006

(65) Prior Publication Data
US 2007/0178891 A1    Aug. 2, 2007

(51) Int. Cl.
*H04M 3/00* (2006.01)
(52) U.S. Cl. .................... 455/420; 455/561.1; 455/566; 345/169
(58) Field of Classification Search ......... 455/418–420, 455/556.1, 566; 345/169
See application file for complete search history.

(56) References Cited

U.S. PATENT DOCUMENTS

| | | | |
|---|---|---|---|
| 6,448,986 | B1 | 9/2002 | Smith |
| 6,948,094 | B2 | 9/2005 | Schultz et al. |
| 7,051,096 | B1 | 5/2006 | Krawiec et al. |
| 7,183,941 | B2 * | 2/2007 | Chuey .................... 340/825.69 |
| 2002/0122053 | A1 | 9/2002 | Dutta et al. |
| 2003/0074200 | A1 * | 4/2003 | Kuzunuki et al. ........ 704/270.1 |
| 2003/0156193 | A1 * | 8/2003 | Nakamura .................. 348/148 |
| 2003/0164848 | A1 | 9/2003 | Dutta et al. |
| 2003/0210266 | A1 | 11/2003 | Cragun et al. |
| 2004/0186713 | A1 | 9/2004 | Gomas et al. |
| 2005/0071165 | A1 | 3/2005 | Hofstader et al. |
| 2005/0099220 | A1 * | 5/2005 | Sato .......................... 327/337 |
| 2006/0053219 | A1 * | 3/2006 | Kutsumi et al. ............. 709/224 |

OTHER PUBLICATIONS

U.S. Appl. No. 10/956,720, filed Oct. 1, 2004, Seymour et al.
U.S. Appl. No. 11/643,257, filed Dec. 20, 2006, Seymour et al.
U.S. Appl. No. 11/643,389, filed Dec. 20, 2006, Seymour et al.

* cited by examiner

*Primary Examiner*—Nhan T Le
(74) *Attorney, Agent, or Firm*—Fish & Richardson P.C.

(57) ABSTRACT

A controlling device (e.g., a telephony device) can remotely control various tasks associated with a controlled device (e.g., a personal computer), including the navigation of user interfaces associated with applications or an operating system associated with the controlled device. A task can be controlled at the controlled device by mapping user input received at the controlling device to control commands suitable for execution at the controlled device.

30 Claims, 4 Drawing Sheets

REMOTE CONTROL OF ELECTRONIC DEVICES

RELATED APPLICATION

The subject matter of this patent application is related to U.S. patent application Ser. No. 10/956,720, filed Oct. 1, 2004, entitled "Spoken Interfaces," which patent application is incorporated by reference herein in its entirety.

TECHNICAL FIELD

The following disclosure generally relates to remote control of electronic devices.

BACKGROUND

Most computer systems include input devices for receiving user input (e.g., mouse, keyboard, etc.). Typically, input devices are local to the computer system and are connected to the computer system by wired or wireless connections. A user can use an input device to navigate a graphical user interface with a cursor or other pointing device, launch applications and interact with the launched applications.

Users often desire to interact with home or office computer systems from remote locations. If the user has access to a remote computer system with a display screen, then the user can control the home or office computer over a network (e.g., Internet, Ethernet, etc.) using a terminal emulation program (e.g., Telnet) or other publicly available remote control application. These publicly available remote control applications display an image of the user's desktop, which allows the user to remotely navigate and interact with their home or office computer system. For some users, however, a remote computer system having a display device may not be available.

SUMMARY

The deficiencies described above or overcome by the disclosed implementations of systems, method and devices for remotely controlling electronic devices.

A first device ("the controlling device") can remotely control various tasks associated with a second device ("the controlled device"), including the navigation of user interfaces associated with applications or an operating system residing on the second device. A task can be controlled at the controlled device by mapping user input received at the controlling device to control commands suitable for controlling the task at the controlled device. Some examples of tasks include navigating user interfaces and/or file systems, executing and controlling functions or features associated with applications or an operating system, collecting information (e.g., system configuration information, state information, etc.).

In some implementations, the controlling device can be a telephony device (e.g., smart phone, etc.). The controlling device can establish communication with the controlled device through a network access device (e.g., a modem). After communication is established, the user can remotely control the controlled device using, for example, the keypad of the phone. If the controlling device is a touchtone phone, then the controlled device can detect Dual-Tone Multi-Frequency (DTMF) digits (also referred to as "tones") that are transmitted by the controlling device. The tones can be mapped to control commands or operating system events for controlling the controlled device.

In some implementations, a cursor can be navigated around a user interface associated with a controlled device using a controlling device. As the cursor traverses the user interface the contents of files, documents, web pages, mail messages, word processing files, links, controls and the like are converted into audible descriptions. The audible descriptions are transmitted back to the controlling device and provide audible feedback to a user of the controlling device, so that the user can navigate and control the user interface without a display screen. This feature provides an advantage over conventional telephony systems where, for example, keys or tones are tied or hardwired to specific commands which can not be changed.

In some implementations, a method of remotely controlling an electronic device includes: establishing communication between a controlling device and a controlled device; receiving input from the controlling device; mapping the input to control commands; and executing the control commands at the controlled device.

In some implementations, a method includes: determining a first spatial position in relation to a plurality of objects on a user interface; receiving through a network an input from a device; determining a second spatial position on the user interface in response to the input; and outputting an audio segment related to the second spatial position.

In some implementations, a method includes: determining a first state of a device to be controlled; receiving through a network an input from a remote device; determining a second state of the device; and outputting an audio segment related to the second state.

In some implementations, a method includes: receiving an input from a controlling device; using the input to control a user interface associated with a controlled device, the user interface having a plurality of objects, wherein controlling the user interface, includes: directionally stepping through the plurality of objects in the user interface to select an object of interest; activating the object of interest in the user interface; and producing an output associated with the activation of the object of interest in the user interface.

DETAILED DESCRIPTION

Remote Control Process

Figure 1:
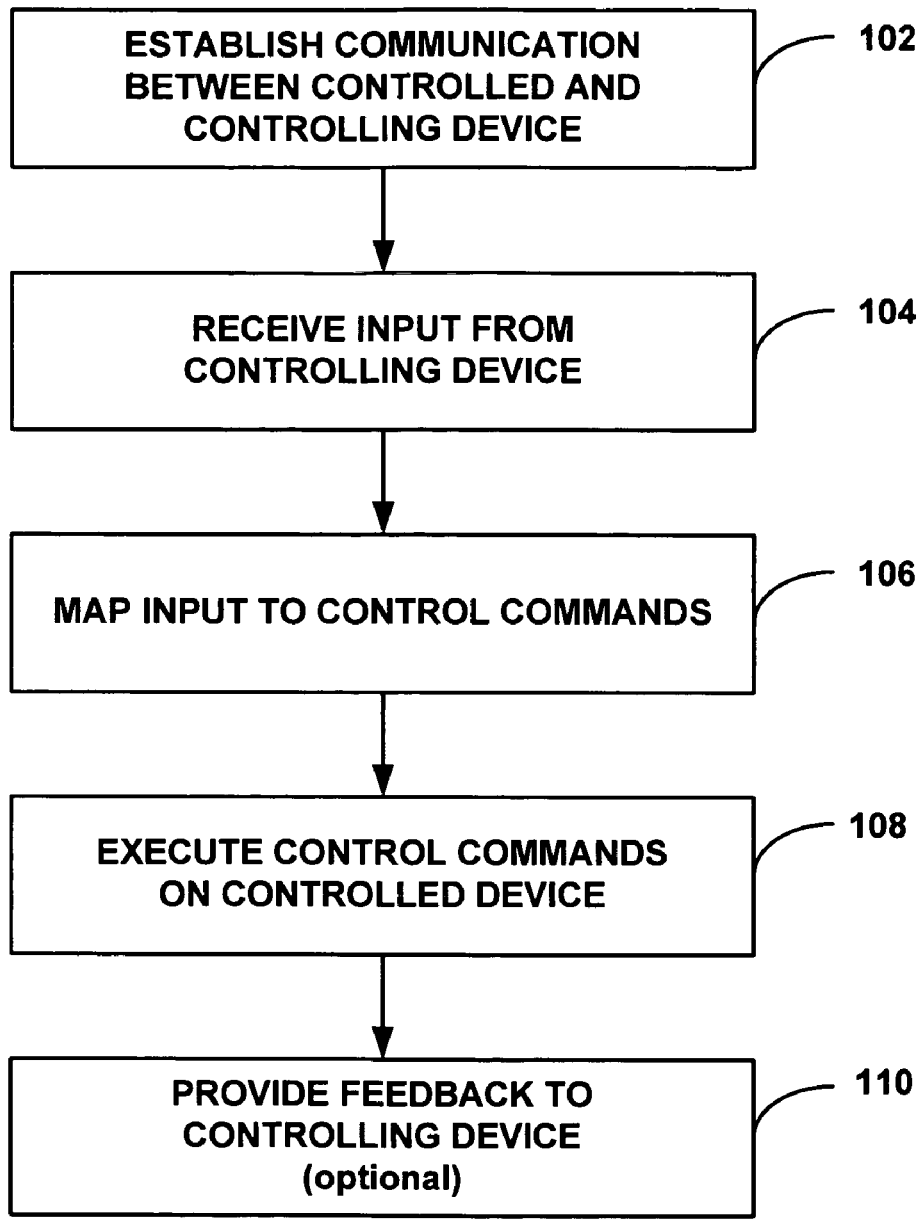
FIG. 1 is a flow diagram of an exemplary process for remote control of electronic devices.

FIG. 1 is a flow diagram of an exemplary process 100 for remote control of electronic devices. The steps of process 100 do not have to occur in any specific order, and at least some steps can be perform simultaneously in a multithreading and/or multiprocessing environment. For the purposes of this example, the device will be described in the context of a personal computer (PC) ("the controlled device") that is controlled by a touchtone phone having a numeric keypad (the "controlling device").

It should be apparent that other devices and system configurations are possible. For example, a controlled device can be a computer system, a computing device, a personal computer, a client computer in a client-server topology, a laptop computer, a portable electronic device, a telephone (landline or wireless), a television receiver (including a high definition television receiver), a set-top box, a personal digital assistant (PDA), a portable media player, an embedded electronic device or appliance, a game console, or any other electronic device. A controlling device can be a POTS telephone, a mobile phone, a smart phone, and any other device capable of transmitting control information to an electronic device over a communication medium.

The term "controlling" includes controlling tasks associated with the controlled device. Tasks can include but are not limited to navigating user interfaces and file systems (including navigating user interfaces associated with applications and the operating system), invoking or launching applications or programs, functions and/or features associated with the controlled device or its peripherals, scrolling through lists, menus or browsers, text entry, collecting information (e.g., meta data, system configuration data), and any other activity that can be locally performed at the controlled device. For example, a user can remotely control the movements of a cursor in a desktop user interface to select a software application (e.g., email) from a menu, desktop icon, or other selection mechanism, launch the selected application, then navigate or interact with a user interface associated with the launched application to perform various tasks.

The process 100 begins when a communication channel is established between the controlling device and the controlled device (102). A communication channel can be established by the controlling device calling a telephone number associated with the controlled device. The telephone call can be placed using one or more communication networks, including but not limited to: the Public Switched Telecommunications Network (PSTN), the Internet (e.g., VoIP), wireless networks, etc. The controlled device can include a telephony interface (e.g., dial-up modem, cable modem, digital subscriber line (DSL), network interface card (NIC), etc.) for receiving the call and for establishing communication with the controlling device.

After communication is established, the user can use the keypad or other input mechanism of the controlling device to enter input, which is received by the controlled device (104). The input can be of the form of key stroke(s) or voice input from the user, which is converted by the controlling device into signals or packets, which can be carried or transmitted over a communication network using one or more known communication protocols (e.g., PCM, TCP/IP, GSM, etc.). In some implementations, the controlling device is a touchtone phone and sends DTMF tones to the controlled device. The controlled device can detect and interpret the tones using a suitable protocol for such purpose, such as the publicly available Telephony Application Program Interface (TAPI).

In some implementations, the controlled device maps the detected signals into control commands or instructions that can be used to control and interact with the controlled device (106). For example, the user can press a key or key combination on the keypad to control one or more tasks, as described with respect to FIG. 2. The maps can be generated and stored at the controlled device or downloaded from a network device or other source. A "map" translates input signals received from the controlling device (e.g., DTMF tones) and maps the signals into commands or instructions that can be executed by a remote control application. The remote control application can be part of an operation system or an application. For example, a client application can be configured to receive telephony information from a telephony server running on the controlled device, as described with respect to FIG. 3. An example of an application that can be remotely controlled is described in U.S. patent application Ser. No. 10/956,720, filed Oct. 1, 2004, entitled "Spoken Interfaces."

In some implementations, mapping is performed by the controlling device. For example, the user can download maps into their mobile phone using known push technologies (PointCast™, Intermind™, etc.). The maps can then be used to map the keys of a conventional keypad to a set of commands or operating system events that are suitable for controlling one or more tasks at the controlled device. There can be a different map for different tasks allowing for a wider variety of tasks to be performed using the same keypad or keyboard. The maps can be generated by software publishers or service providers, or can be generated by users at the controlling device or through a web site. For example, a user can create a map using a tool hosted on a network. The map can then be downloaded into the phone in response to a key combination entered by the user or some other trigger event. In some implementations, the appropriate maps can be sent with the input command signals to the controlled device, and the maps can be applied at the controlled device. In some implementations, a description of the appropriate maps can be sent with the input command signals to the controlled device and the maps can be constructed and applied at the controlled device.

Figure 3:
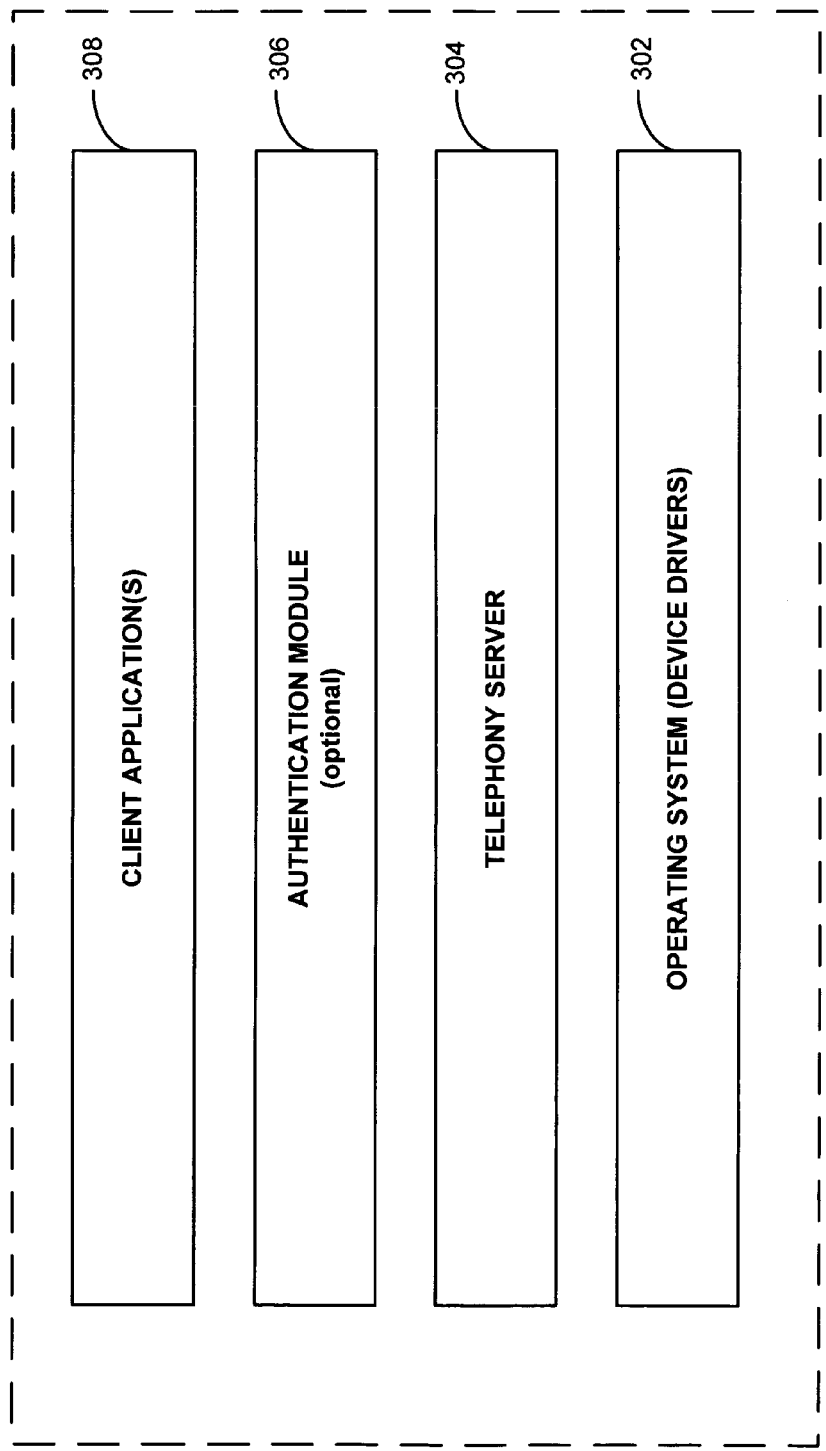
FIG. 3 is a block diagram of an exemplary software architecture for a controlled device.

After the input is mapped to control command, the commands can be executed by one or more client applications residing on or associated with the controlled device (108), as described with respect to FIG. 3. In some implementations, the controlled device can provide feedback to the controlling device (110). If the user is using the controlling device to navigate in a user interface associated with the controlled device, then the controlled device can send speech audio signals back to the user, which can inform the user of the location of the cursor. For example, as the user navigates the cursor over various objects in the user interface (e.g., buttons, links, files, images, application launch icons, etc.), a speech generator can generate files (e.g., .wav files) containing speech describing objects and/or their spatial positions on the user interface as the objects are traversed by a cursor (e.g., "menu bar", "enter", "file", "email", "Word", etc.). The speech files can be converted into signals (e.g., PCM signals) that are suitable for transmission back to the controlling device where they can be reconstructed and played for the user through an audio system or displayed as text or images if the controlling device includes a display screen. Many types of feedback are possible, including video, still images, graphics, text messages and the like. In some implementations, a first spatial position is determined in relation to a plurality of objects on a user interface associated with a controlled device. The controlled device receives an input from a controlling device through communication medium. A second spatial position is determined on the user interface in response to the input. An audio segment related to the second spatial position is transmitted back to the controlling device.

Example Keypad Operation

Figure 2:
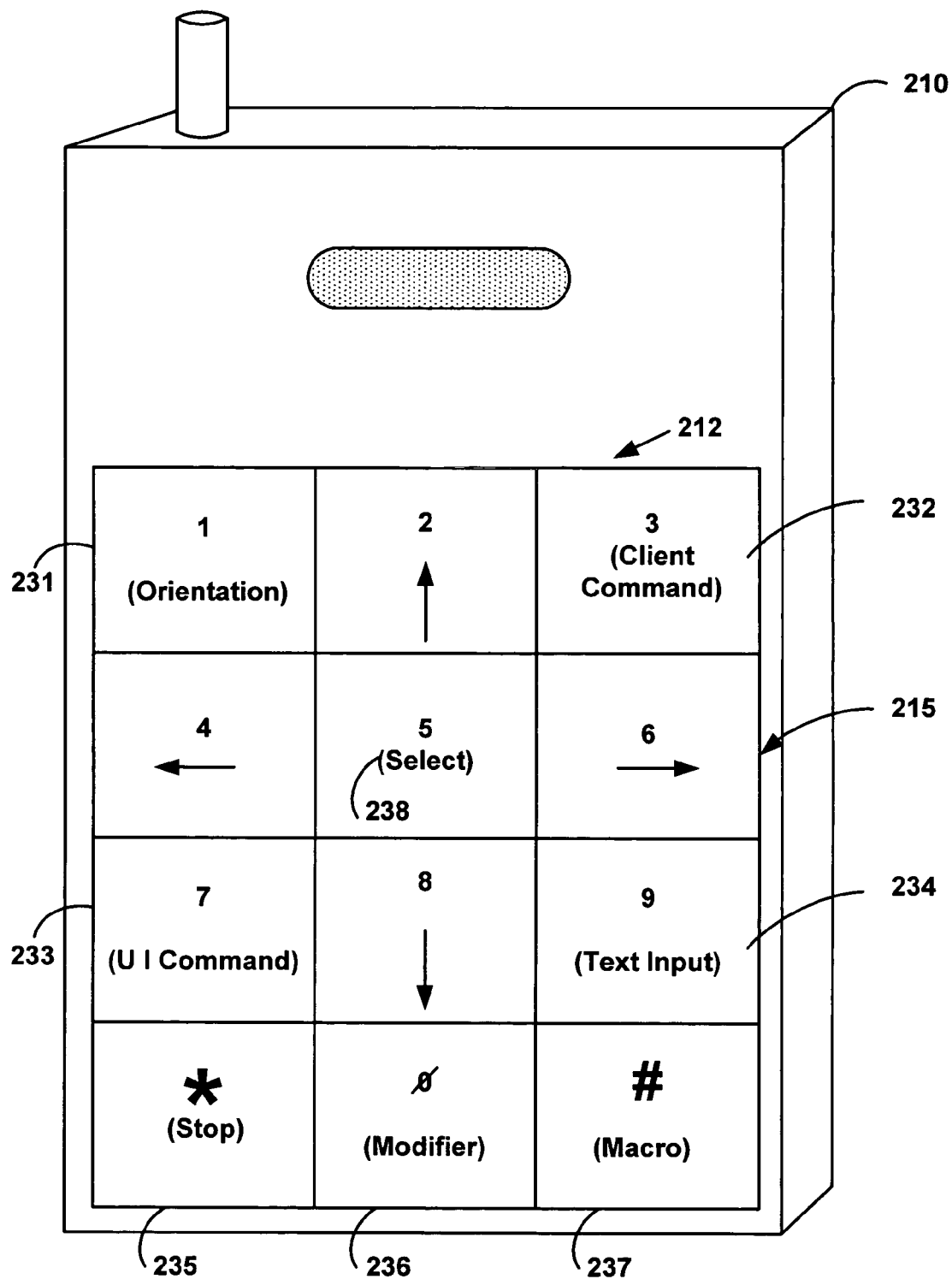
FIG. 2 illustrates an exemplary keypad of a controlling device.

FIG. 2 illustrates an exemplary keypad 212 of a controlling device 210 (e.g., a telephony device). In some implementations, the keypad 212 includes keys 215 for numbers 0 through 9, an asterisk key 235 and a pound key 237. One or more of the keys 215 can be mapped to remote control functions associated with tasks to be performed at the controlled device. In this example, the remote control functions associated with the keys 215 are shown in parentheses. In a normal mode of operation, the keys 215 can be used to perform typical functions associated with the controlling device (e.g., place a telephone call). In a remote control mode, the keys 215 perform remote control functions, as determined by the mapping then in effect on the controlled or controlling device. For example, when the user wants to use the controlling device 210 to remotely control another device, the user can select a key combination (or dedicated function key, if available) to place the controlling device 210 into the remote control mode. There can be a different key combination for each mapping available in the controlled or controlling device. A user can invoke the appropriate map for the application or function that the user desires to control (e.g., browser, email, operating system utilities, etc.) For example, when remotely controlling an email application the user may want to map one of the keys 115 to a "send" command and another to a "reply" command, which are commands often associated with email applications.

In the implementation shown in FIG. 2, the mapping provides for the navigation of a user interface associated with the controlled device. For this particular mapping, the keys 2,4,6,8 are directional keys for controlling navigation in an upward, leftward, rightward, or downward direction, respectively, in a two-dimensional user interface. By contrast, the keys 0,1,3,5,7,9,*,# are functional keys.

Other mappings of the keypad 212 are possible. For example, the keypad 212 can include one or more dedicated function keys for remotely controlling particular tasks at the controlled device. For example, the keypad 212 could include dedicated keys for controlling email functions, such as send, reply, delete, etc.

The directional keys 2,4,6,8, can be used to control the movements of a cursor in a user interface associated with the controlled device. This can be a default mode of operation for the directional keys. Other modes of operation are possible. For example, one or more functional keys can be manipulated to place the device in a different operational mode, where particular ones of the directional keys are mapped to different navigation or interaction events. The functional keys can be manipulated to operate in a default mode, with each functional key associated with a functional operation (e.g., save, select, open, etc.). One or more functional keys can also be manipulated to place the device in a different operational mode, where functional keys (or directional keys) are mapped to different navigation or functional operations. For example, where only one functional mode exists, the * key can be used to enter and exit the functional mode.

In the implementation shown, the keypad 212 includes four directional keys and eight functional keys. Alternatively, other numbers of directional keys can be used that map to different navigational parameters in different dimensional systems (e.g., three dimensional systems with six directional keys). In one implementation, depressing a directional key results in movement of the cursor in a step operation on the user interface of the controlled device. The size of the step can be pre-defined. The user interface at the controlled device can include snap-to-grid functionality that allows for stepping across the presentation area of the user interface by the cursor. Other kinds of steps (e.g., to a next item in a list or next object on a page, etc.) can be used.

In some implementations, the keypad 212 includes eight functional keys that are mapped to keys 115 as follows: orientation command-1, client command-3, UI command-7, selection-5, application command-9, text input command, start/stop-*, modifier command-0 and macro command-#. Other mappings are possible. In addition, customized mappings can be associated with a given user or controlling device 210. For example, the controlling device 210 is a telephone, then caller identification information can be used to determine a mapping for the functional keys that are customized for a given user. Customization of directional keys is also possible.

The orientation command key 231 can be manipulated to request audio feedback for a current location (e.g., hovering over a send button) or a current environment (e.g., currently in e-mail application). The client command key 232 provides application-level controls such as "read current element of text" (word, line, or entire document), non-sequential navigation, and the like. For example, the client command key 232 can allow a user to navigate from a list of e-mails to the content of the e-mail in a non-sequential manner (e.g., allowing a user to view content of email in a list of emails, rather than merely scrolling to a next email in the list).

The UI command key 233 when manipulated provides user interface-level controls such as moving between windows or launching a program menu. The text input key 234 when manipulated allows a user to enter text into an application and can leverage technologies (e.g., Short Message Service (SMS)) to transmit the text to the controlled device. In some implementations, the text input key 234 toggles between on and off states that allows other keys to be mapped to particular textual elements. When toggled on, manipulation of the mapped keys produces textual output at the controlled device. The controlled device can include text completion routines that facilitate the easy entry of text through the controlling device 110. For example, text completion routines can provide an audible feedback of a selectable "completion" to a partial text entry. In a text mode, one of the other keys not mapped to textual elements can be used to select the "completion" to save user key strokes.

Start/stop key 235 allows for the entry or exit from a functional mode. In some implementations only one functional mode is provided. In some implementations, the start/stop key 235 is only used to exit from the functional mode. For example, where only one function mode exists, another functional key can be depressed to start the functional mode. Alternatively, the start/stop key 235 can be used to toggle through different functional modes of the controlling device 210.

A modifier command key 236 can be used to modify or overload the functionality of the keys 215 in the same manner as the "Shift," "Ctrl" and "Alt" keys of a QWERTY keyboard. If the user presses the modifier key 236 followed by one of the other keys 215, then the key will perform a different function. Alternatively, if the user holds down the modifier key 236 while pressing one of the other keys, then the pressed key will provide a different function.

A macro command key 237 allows for the selection of one or more pre-defined macro routines. A library of routines can be stored in memory of the controlled device or the controlling device 210. After selection of the macro command key, a sequence number or combination of key strokes can be used to select from different routines stored in the library for transmission to the controlled device. For example, scripts can be stored for logging in, navigating to, and opening an email application, opening an input box, and selecting a first item in the inbox for review. Alternatively, the macro command key 237 can be used to store a sequence of key strokes for later retrieval. In some implementations, after initiation of the macro command key 237, a record start sequence is entered. Thereafter, a record sequence stop key can be depressed to end the recording session. A prompt can be provided by the input device to designate the sequence for storage in the library for easy future retrieval.

Controlled Device Software Architecture

FIG. 3 is a block diagram of an exemplary software architecture 300 for a controlled device. Other software architectures are possible. For example, the various components of the architecture 300 do not have to be separate processes but can be part of a single process that is performed by the operating system 302 or a single application.

Input signals from a controlling device (e.g., DTMF tones) are received by a hardware interface installed in or coupled to the controlled device (e.g., a modem, etc.). An operating system 302 and/or other low level software (e.g., device drivers, kernel) establishes communication with the modem hardware and provides a software interface between the hardware and a telephony server process 304. The telephony server process 304 provides telephony data to client applications 308. In some implementations, the telephony server process 304 maps the telephony data into control commands that can be received and interpreted by one or more client applications 308. In other implementations, the client applications 308 receive telephony data in standard or intermediate format and perform their own mappings. Still in other implementations, a separate remote control application communicates with the telephony server 304 and performs mappings of telephony data for use by client applications 308.

In some applications, an additional authentication process 306 is performed before client applications 308 can be controlled. The authentication process 306 can include known authentication technologies. For example, the authentication process 306 can include AES encryption (e.g., 128-bit keys) and passwords. In some implementations, user authentication data received from the controlling device can identify a user profile for use in controlling a user interface or performing other tasks at a controlled device.

In some implementations, a Caller ID can be used to start a security event or sequence. The controlled device can use a Caller ID to identify users, then perform security actions based on the identity of the users. For example, only certain individuals may be allowed to control the controlled device, while other users are blocked.

An example of a client application 308 suitable for being remotely controlled is the VoiceOver® application provided with Apple Computer, Inc.'s Mac OS® X v10.4 ("Tiger") operating system. VoiceOver® reads aloud the contents of files, including web pages, mail messages and word processing files, provides a comprehensive audible description of a user's workspace and includes a rich set of keyboard commands that allow users to navigate the Mac OS® X interface and interact with application and system controls. The audible descriptions can be converted to signals suitable for transmission to the controlling device, where they can be reconstructed and played for the user through an audio system (e.g., telephone receiver). Thus, a user who is controlling an application or navigating a user interface can be guided by the audible descriptions without an visual aids. Thus, standard POTs telephones can be used to control tasks on an electronic device, which is not possible with conventional remote control technologies that provide only visual feedback, and therefore require a display screen at the controlling device.

Controlled System Hardware Architecture

Figure 4:
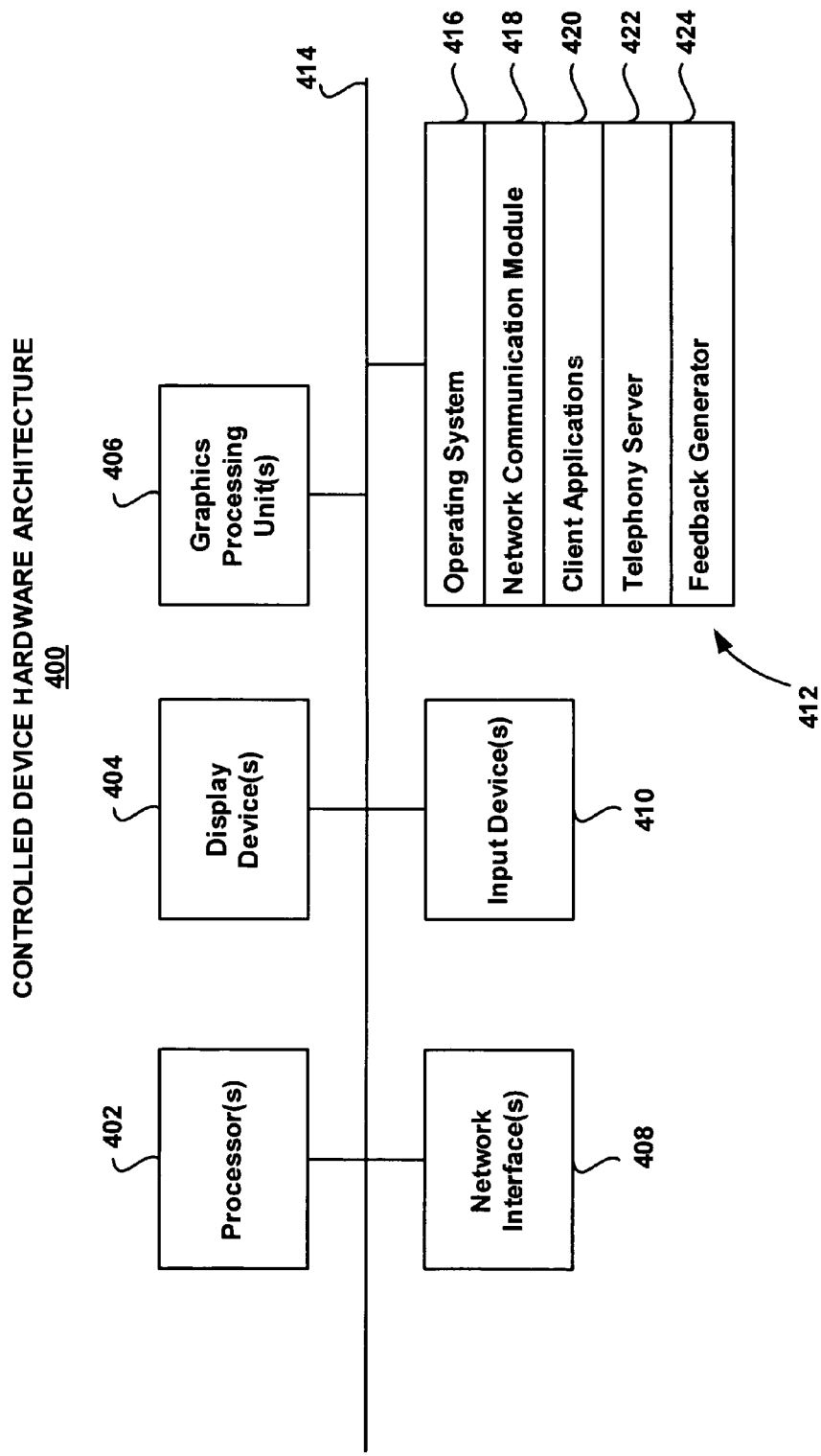
FIG. 4 is a block diagram of an exemplary hardware architecture for a controlled device.

FIG. 4 is a block diagram of an exemplary hardware architecture 400 for a controlled device. The architecture 400 includes one or more processors 402 (e.g., IBM PowerPC®, Intel Pentium® 4, etc.), one or more display devices 404 (e.g., CRT, LCD) or no display devices, one or more graphics processing units (GPUs) 406 (e.g., NVIDIA Quadro FX 4500, GeForce 7800 GT, etc.), one or more network interfaces 408 (e.g., Ethernet, FireWire, USB, etc.), one or more input devices 410 (e.g., keyboard, mouse, etc.), and one or more computer-readable mediums 412 (e.g. SDRAM, optical disks, hard disks, flash memory, L1 or L2 cache, etc.). These components exchange communications and data via one or more buses 414 (e.g., EISA, PCI, PCI Express, etc.).

The term "computer-readable medium" refers to any medium that participates in providing instructions to a processor 402 for execution, including without limitation, non-volatile media (e.g., optical or magnetic disks), volatile media (e.g., memory) and transmission media. Transmission media includes, without limitation, coaxial cables, copper wire and fiber optics.

The computer-readable medium 412 further includes an operating system 416 (e.g., Mac OS®, Windows®, Linux, etc.), a network communication module 418, client applications 420, a telephony server process 422 and a feedback generator 424.

The operating system 416 can be multi-user, multiprocessing, multitasking, multithreading, real-time and the like. The operating system 416 performs basic tasks, including but not limited to: recognizing input from input devices 410; sending output to display devices 404; keeping track of files and directories on computer-readable mediums 412 (e.g., memory or a storage device); controlling peripheral devices and processors (e.g., disk drives, printers, GPUs, etc.); and managing traffic on the one or more buses 414. The network communications module 418 includes various components for establishing and maintaining network connections (e.g., software for implementing communication protocols, such as TCP/IP, HTTP, Ethernet, etc.).

A client application 420 can be any application or operating system task that is capable of being remotely controlled (e.g., desktop, email, media player, browser, word processor, accessibility application, assistant or wizard application, etc.), or a single application or process that facilitates the remote control of other applications. The telephony server process 422 communicates with telephony hardware (e.g., a modem) and in some implementations maps telephony data into control commands for client applications 420. The feedback generator 424 provides feedback to the controlling device. For example, the feedback generator 424 can perform text-to-speech conversion, as described with respect to FIG. 1.

The invention and all of the functional operations described herein can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit) or other customized circuitry.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a device having a display, e.g., a CRT (cathode ray tube) or LCD (liquid crystal display) monitor, for displaying information to the user and an input device, e.g., a keyboard, a mouse, a trackball, and the like by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in, e.g., a computing system, a handheld device, a telephone, a consumer appliance, or any other processor-based device. A computing system implementation can include a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

A number of implementations have been described. Nevertheless, it will be understood that various modifications may be made. For example, and as noted above, reference is made to a client-server telephony process in a controlled device. Other configurations are possible, including those with direct control of a controlled device by a controlling device. The user interface can include navigation objects such as graphical buttons, fields, text boxes, text, application shortcuts, files, windows, menus, and the like. The user interface can map the navigation objects to a dimensional space (e.g., in a 2-D spatial relationship). In response to keypad input, the controlled device can send spatial directions to the user interface (e.g., to control movement of a cursor in response to a directional key), or commands to move directly to a particular object (e.g., in response to a functional key). In response to a selection, the user interface can initiate actions such as launching an application or traversing a file structure. In one implementation, the controlled device leverages an existing hierarchy within an application when navigating. For example, a table embedded in a document can be navigated as an object rather than cell by cell. In response to a user command that selects the object, navigation can proceed at the table-level between cells.

Though not discussed above, one of ordinary skill in the art will recognize that an initial orientation may need to be required to facilitate control of the controlled device. For example, initial orientation can be controlled by either an announcement to the user prior to an initial interaction or a pre-defined placement of the cursor or state of the device.

What is claimed is:

1. A method comprising:
   receiving an input from a telephony device;
   using the input to control a software user interface associated with a controlled device, the software user interface having a plurality of user interface objects, wherein controlling the software user interface, comprises:
   directionally stepping through the plurality of user interface objects displayed in the software user interface to select a user interface object of interest;
   activating the user interface object of interest in the software user interface; and
   producing an output associated with the activation of the user interface object of interest;
   where a function mapped to an input provided at the telephony device initiates gathering information to determine a state of the controlled device at the telephony device.

2. The method of claim 1, where the input is a tone.

3. The method of claim 1, where the input is a voice command.

4. The method of claim 1, where the telephony device is a telephone.

5. The method of claim 1, where the software user interface is a graphical user interface.

6. The method of claim 1, where the output includes audio signals of speech descriptions.

7. The method of claim 1, where the output produces audio feedback in the telephony device.

8. The method of claim 1, further comprising receiving user authentication data from the telephony device.

9. The method of claim 8, where the user authentication data identifies a custom user profile for use in manipulating the software user interface.

10. The method of claim 1, where the input generates control commands for maneuvering through a hierarchical structure of user interface objects within applications associated with the controlled device.

11. The method of claim 1, where a function mapped to an input at the telephony device provides access to user interface objects within an application associated with the controlled device.

12. The method of claim 1, where a function mapped to an input provided at the telephony device provides access to a desktop feature from a plurality of desktop features consisting of: searching for files or information, navigating the desktop or other user interface, launching an application or operating system task, or selecting an item, icon or file.

13. The method of claim 1, where a function mapped to an input provided at the telephony device provides for execution of an application-specific or client-specific command.

14. The method of claim 1, where a function mapped to an input provided at the telephony device initiates a text-input mode.

15. The method of claim 1, where the information is an audio signal of speech descriptions.

16. The method of claim 1, where the state is related to the selected user interface object of interest.

17. A computer-readable medium having instructions stored thereon, which, when executed by one or more processors, causes the one or more processors to perform operations comprising:
   receiving an input from a telephony device;
   using the input to control a software user interface associated with a controlled device, the software user interface having a plurality of software display objects, wherein controlling the software user interface, comprises:
      directionally stepping through the plurality of software display objects in the software user interface to select a software display object of interest;
      activating the software display object of interest in the software user interface; and
      producing an output associated with the activation of the software display object of interest in the software user interface;
   where a function mapped to an input provided at the telephony device initiates gathering information to determine a state of the controlled device at the telephony device.

18. The computer-readable medium of claim 17, where the input is a tone.

19. The computer-readable medium of claim 17, where the input is a voice command.

20. The computer-readable medium of claim 17, where the telephony device is a telephone.

21. The computer-readable medium of claim 17, where the software user interface is a graphical user interface.

22. The computer-readable medium of claim 17, where the output includes audio signals of speech descriptions.

23. The computer-readable medium of claim 17, where the output produces audio feedback in the telephony device.

24. The computer-readable medium of claim 17, further comprising receiving user authentication data from the telephony device.

25. The computer-readable medium of claim 24, where the user authentication data identifies a custom user profile for use in manipulating the software user interface.

26. The computer-readable medium of claim 17, where the input generates control commands for maneuvering through a hierarchical structure of software display objects within applications associated with the controlled device.

27. The computer-readable medium of claim 17, where a function mapped to an input at the telephony device provides access to software display objects within an application associated with the controlled device.

28. The computer-readable medium of claim 17, where a function mapped to an input provided at the telephony device provides access to a desktop feature from a plurality of desktop features consisting of: searching for files or information, navigating the desktop or other user interface, launching an application or operating system task, or selecting an item, icon or file.

29. The computer-readable medium of claim 17, where a function mapped to an input provided at the telephony device provides for execution of an application-specific or client-specific command.

30. The computer-readable medium of claim 17, where a function mapped to an input provided at the telephony device initiates a text-input mode.

* * * * *

UNITED STATES PATENT AND TRADEMARK OFFICE
CERTIFICATE OF CORRECTION

PATENT NO. : 7,634,263 B2
APPLICATION NO. : 11/343514
DATED : December 15, 2009
INVENTOR(S) : Louch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Ninth Day of November, 2010

David J. Kappos
*Director of the United States Patent and Trademark Office*